March 10, 1970 R. C. BASKIN 3,500,431

MAGNETIC RECORDER SYSTEM

Filed Nov. 3, 1967 5 Sheets-Sheet 1

INVENTOR

Robert C. Baskin

BY

DeLio and Montgomery

ATTORNEYS

MAGNETIC RECORDER SYSTEM

Filed Nov. 3, 1967 5 Sheets-Sheet 2

INVENTOR
Robert C. Baskin

BY
DeLio and Montgomery
ATTORNEYS

| | 1 | 2 | 4 | 8 |
|---|---|---|---|---|
| 0 | 0 | 1 | 0 | 1 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

INVENTOR
Robert C. Baskin

BY
De Lio and Montgomery
ATTORNEYS

INVENTOR
Robert C. Baskin

BY De Lio and Montgomery
ATTORNEYS

March 10, 1970 R. C. BASKIN 3,500,431

MAGNETIC RECORDER SYSTEM

Filed Nov. 3, 1967 5 Sheets-Sheet 5

INVENTOR

Robert C. Baskin

BY De Lio and Montgomery

ATTORNEYS

United States Patent Office 3,500,431
Patented Mar. 10, 1970

3,500,431
MAGNETIC RECORDER SYSTEM
Robert C. Baskin, West Hartford, Conn., assignor to Ripley Company, Inc., Middletown, Conn., a corporation of New York
Filed Nov. 3, 1967, Ser. No. 684,097
Int. Cl. G01d 4/00
U.S. Cl. 346—74 14 Claims

ABSTRACT OF THE DISCLOSURE

A system for recording on magnetic tape the information stored in a meter, comprising means for generating a first plurality of timing signals, a magnetic tape drive including a motor adapted to be stepped along by said first plurality of timing signals, means responsive to said plurality of timing pulses for generating a scanning signal to interrogate said meter, means responsive to said timing signals for generating a plurality of gating signals, means responsive to said timing signals for generating a plurality of print signals, and means responsive to information provided by said interrogated meter, said gating signals, said print signals and said scanning signals for writing said information on said tape as the motor is stepped.

This invention relates to a magnetic tape recorder and more particularly to a magnetic tape recorder suitable for detecting information stored in a meter such as the usual type of commercial or residential watt-hour meter (water meter, gas meter or the like) and thereafter storing the information on magnetic tape. More particularly, this invention relates to a system for sequentially sensing information stored within a plurality of meter registers and converting such information to a format suitable for recording in a predetermined time sequence on magnetic tape.

The principal purpose of this invention is to provide a small, lightweight magnetic tape recorder system which may be carried by a meter reader on his normal rounds of commercial or residential installations which use public or private sources of energy, water, or the like.

The system of this invention is intended for use with metering devices, such as shown in U.S. Patents 3,195,814 and 3,006,712, or the like, and in conjunction with multiple electrical connectors, such as disclosed in U.S. Patent 3,222,471 or the like.

In order to reduce billing costs, private utilities have begun to automate their data collection systems. At the present time, it is contemplated that a meter reader will utilize a recorder which may be plugged into an outlet on the exterior of an installation. The outlet would be connected to a meter, such that an indication of the meter reading could be obtained. As of the present time, meter readers have begun to utilize interrogation devices which provide visual indication of the meter reading within the installation. This information is then returned to the 'Home Office' where it is entered on punch-cards and is then utilized in the data processing system of the utility for preparation of bills.

In order to avoid the necessity of the meter reader actually recording the data, it has been proposed that a recording system be utilized for recording the data on a tape or other suitable recording media, such that it may be brought to the office of the utility and thereafter processed in the data processing system of the utility. In this manner, the meter reader would no longer have to manually record the meter reading and the information would not have to be transcribed at the office of the utility.

Accordingly, it is an object of this invention to provide a new and improved system for recording information from a meter onto magnetic tape in a format suitable for data processing.

It is another object of this invention to provide a new and improved recording system suitable for being carried by a meter reader and which will record the data stored in each of the meter registers.

Still other objects and advantages of this invention will in part be obvious and will in part appear from the specification.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description taken in connection with the accompanying drawings, in which FIG. 1 is a block diagram of the magnetic recorder system of this invention, including a metering apparatus;

Figure 1:
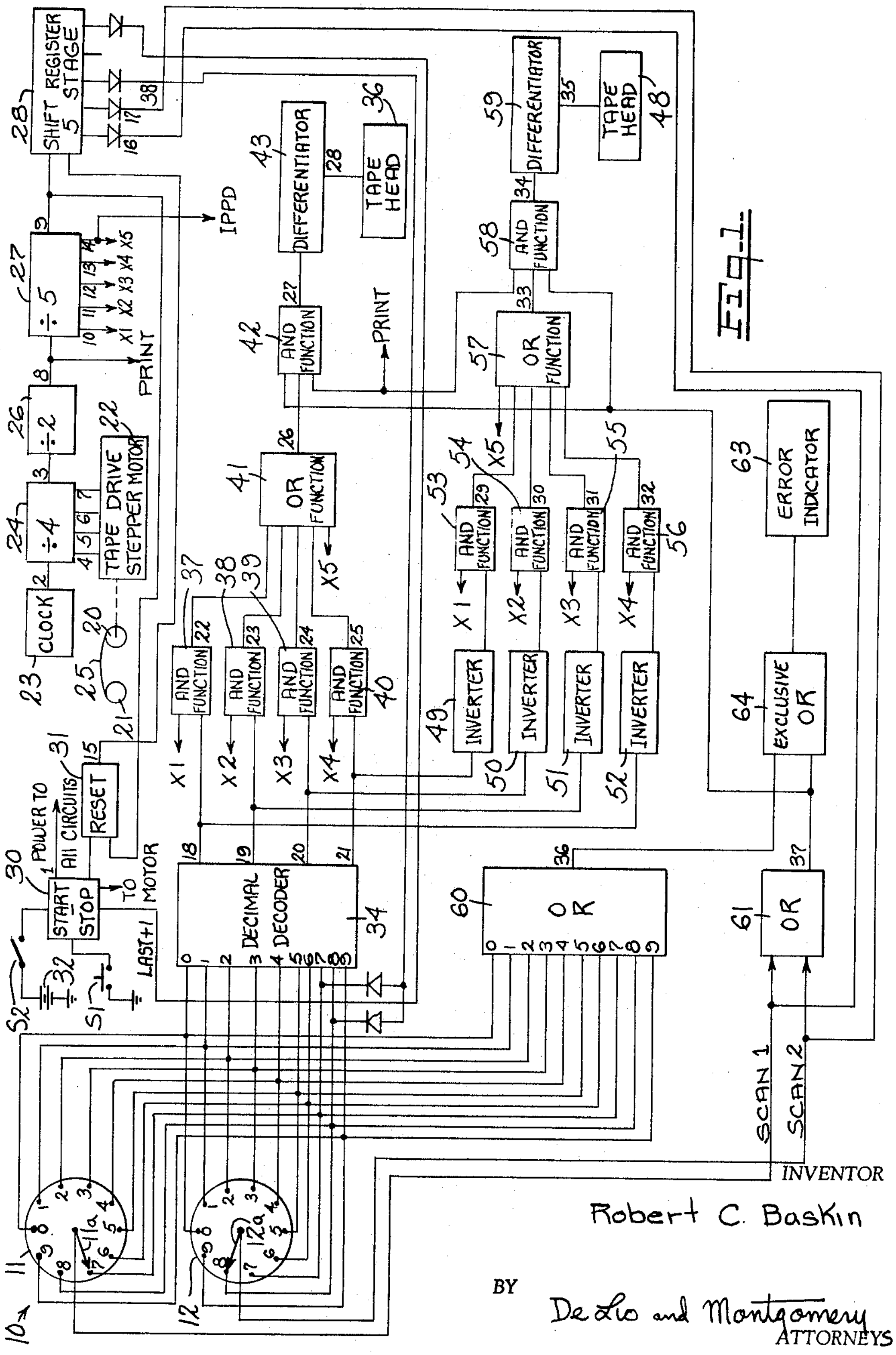
Figure 7:
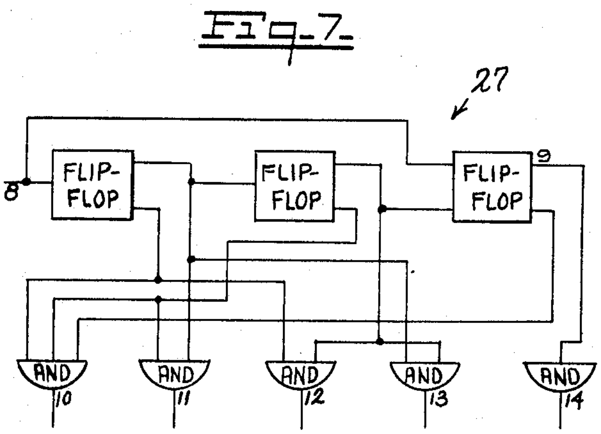
Figure 6:
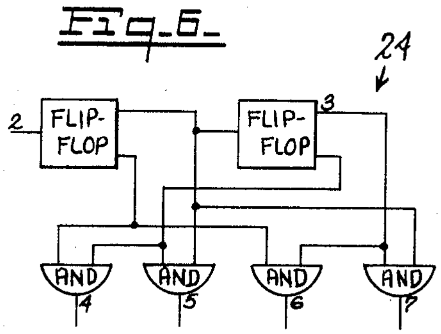
Figure 8:
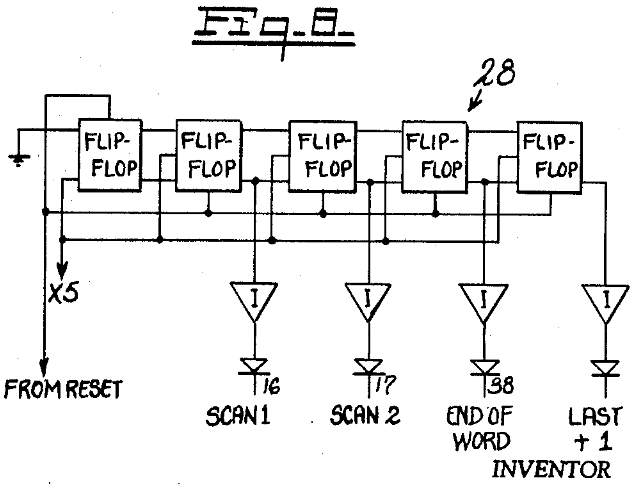

FIGS. *5a* and *5b* is the timing diagram illustrating signal waveforms at various points in the circuit of FIG. 1;

FIGS. 6 and 7 are diagrams illustrating a scheme for developing a series of 4 and 5 timing signals in accordance with this invention; and FIG. 8 is a diagram illustrating a 5-stage shift register according to this invention.

Figure 2:
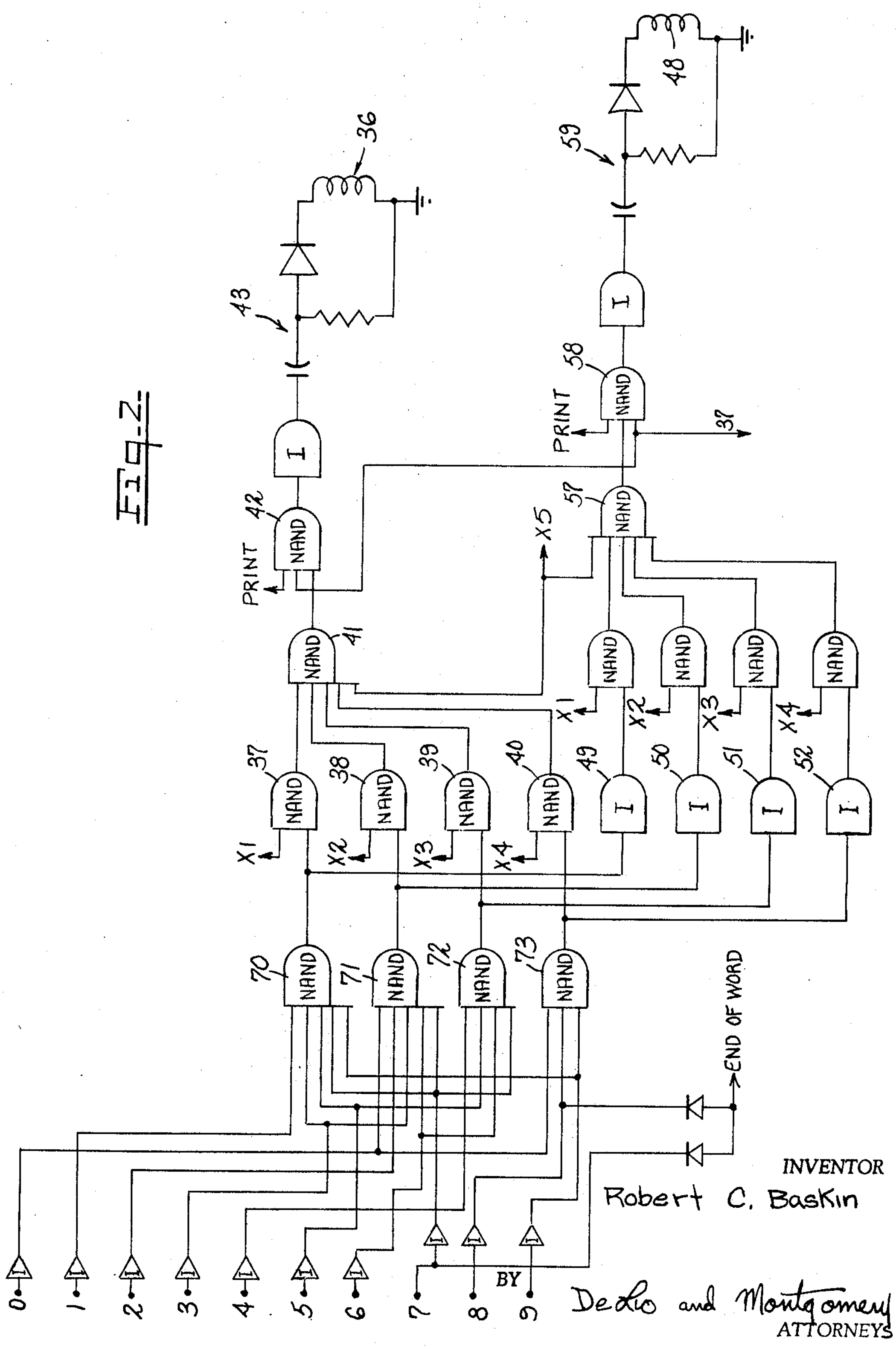
FIG. 2 is a logical block diagram, partially in schematic form, of the decimal to binary coded decimal decoder of FIG. 1.

Referring to FIGS. 1 and 2, there is generally shown at 10 an auxiliary meter including two rotary switches 11 and 12, which may be coupled to the units and tens registers of a common utility meter. The two rotary switches are generally called an auxiliary meter for the purposes of this invention, although it should be understood that the meter itself could be constructed in this manner. The wiper arms shown at 11*a* and 12*a* may be journalled directly to the pointer of the utility meter itself in the manner as shown in the previously mentioned patents. Output lines from each of these rotary switches, that is, outputs 0–9, may then be brought to a receptacle mounted on the outside of a house, such as shown in the above-mentioned patents. Scanning signals may then be provided along the scan lines to the wiper arms to interrogate each of the registers of the auxiliary meter. A probe such as disclosed in the abovementioned patents may then be used to obtain the data from the meter as well as to scan each register of the meter.

The magnetic tape recorder system of this invention operates in a step-by-step manner and applies the data from each of the meters 11 and 12 in a serial format to two tracks of a tape, one track being the data itself and the other track utilized to provide the negation of the data so as to provide signals which may be utilized in a playback device to indicate whether or not there is an error in the data.

Referring now particularly to FIG. 1, there is shown a tape drive system comprising a plurality of tape reels 20 and 21 which are driven sequentially by a stepper motor 22. The entire system timing is a function of clock signals (pulses) provided from a clock such as a multivibrator shown at 23. Thereafter, the clock signals are divided by 4. This is accomplished by a pair of flip-flops generally shown at 24. The four signals derived from the divide by 4 device 24 are utilized to step the motor 22 and thus the tape 25 so as to record data on magnetic tape shown at 25.

Thereafter, the signal emanating from the divide by 4 circuit 24 is divided again, by 2, by a device shown at 26 to provide a print signal. The print signal is utilized to limit the flow of information from the auxiliary meters to the tape head in order to write the data on the tape. The signal emanating from the divide by 2 circuit 26 enters a divide by 5 circuit 27 which comprises a plurality of flip-flops and AND logic. From the circuit 27 there are provided five signals, shown ×1 through ×5. The last signal from the circuit 27 (the ×5 signal) is also provided to a shift register 28 comprising a plurality of flip-flops which provide scanning signals shown at scan 1, scan 2, an end-of-word signal and a last +1 signal. These signals control the scanning of the registers of the meter as well as the operation of the system.

In order to control the operation of the clock, as well as the other timing signal generators, there is provided a start-stop circuit at 30 and a reset circuit at 31. A battery, shown at 32, also provides power through switch S2 to the start-stop circuit 30. The pushbutton initiation switch is shown at S1, which starts the operation of the system. The operation of the system is completed by the provision of the signal "last +1" from the shift register 28 which is detected by the start-stop circuit 30 and which causes the system to turn off.

Assuming now that the wiper arm 11*a* is on the 7-position and the wiper arm 12*a* is on the 8-position, and the start button has been depressed to start the operation of the system, the start circuit will permit power to be applied to all circuits except the start-stop circuit and the reset circuit, and the clock will begin to run. When the ×5 signal appears for the first time, it sets the reset flip-flop 31 to enable the shift register 28 to shift pulses therethrough. When the ×1 signal appears for the second time, a signal is provided from the scan 1 line of the shift register to the auxiliary meter 10 to interrogate it. The 7-input to the decimal to binary decoder shown at 34 will be "alive" to provide signals at the outputs of the decoder 34. Thereafter, timing signals will be provided from ×1 to ×4, to sequentially sample the four output lines of the decimal to binary decoder. At the same time, the tape drive stepper motor 22 is advancing the tape a step at a time in coincidence with the outputs from circuit 24. Outputs from the decimal to binary coded decimal decoder 34 provide data to the first channel tape head, shown at 36, which is coupled to AND circuits shown at 37–40. Thence, the outputs from the AND circuits go through an OR circuit 41, then through AND circuit 42 which is controlled by the print output signal from the circuit 26. The output from AND circuit 42 is then differentiated to apply a signal to the coil of the tape head 36 by a differentiator 43.

Simultaneously, the same is occurring with the data provided to the channel 2 tape head 48 through inverters shown at 49–52. The data on channel 2 is the negation of the data applied to channel 1. These signals are also simultaneously provided to AND circuits 53–56, respectively, which are controlled by the ×1, ×2, ×3 and ×4 outputs from the circuit 27. Data from these AND circuits is provided to an OR circuit 57 and thence through an AND circuit 58 which is controlled by the print signal from the circuit 26. These signals are then fed to the differentiator 59 so as to energize the coil of the tape head 48. Data laid down on channels 1 and 2 by the tape heads 36 and 48, respectively, is in time-sequence but opposite to each other, that is, when there is data on channel 1, there should be no data on channel 2. At this time, the scan 2 signal arrives along the scan 2 line and causes the register 12 to be read out in a like manner. Thus, there is a representation of the units and tens recorded on the tape in a serial format.

In addition, during the above, each time the ×5 output appears from the device 27 a signal is provided to the OR circuit 41 to indicate an end of digit by applying signals on both channels 1 and 2. After all the registers are interrogated, the end-of-word signal appears and is applied to the decoder 34, lines 7 and 8, to generate four bits in the 1, 2, 4 and 8 binary position. After the two scanning signals and the end-of-word signal have been provided, the last +1 signal appears and stops the entire operation by controlling the start-stop circuit 30.

It should be understood that if additional registers are desired to be read out (i.e., hundreds, thousands, etc.) the register 28 could be constructed with additional flip-flops to provide additional scanning signals.

While the foregoing was taking place, the data is constantly being checked to determine whether or not the auxiliary meters are operating correctly. This is accomplished by the use of an OR circuit shown at 60 and an OR circuit 61. The OR circuit 60 is coupled to the outputs from the receptacle of the auxiliary meters 0–9 and the OR circuit 61 is coupled to the shift register 28. As long as there is a signal on one of the 0–9 lines and a signal on one of the scan lines, no error signal will be indicated by the error indicator, such as a light 63. This is accomplished by the use of exclusive OR circuit 64 which is responsive to the OR circuits 60 and 61.

Figure 5A:
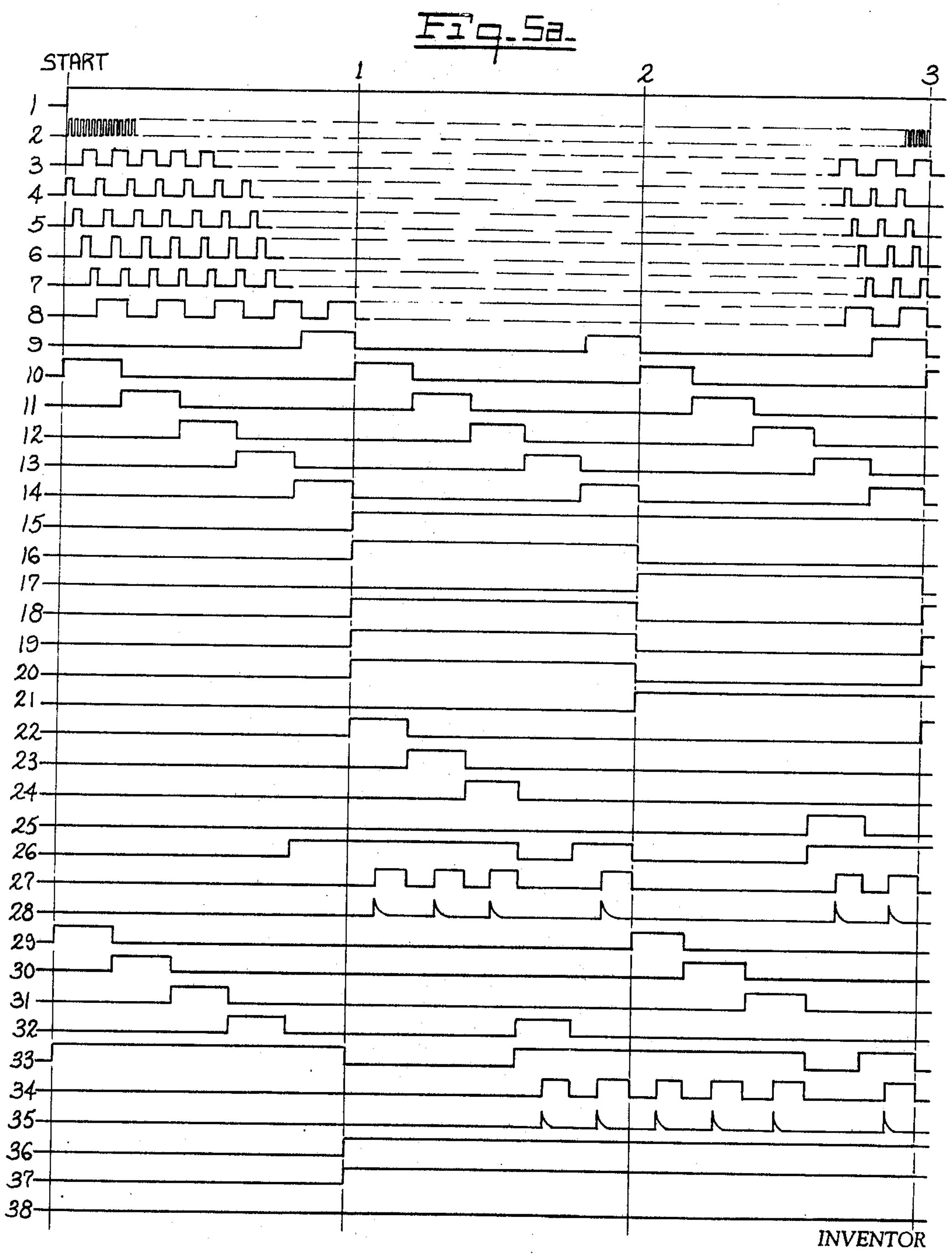
Figure 5B:
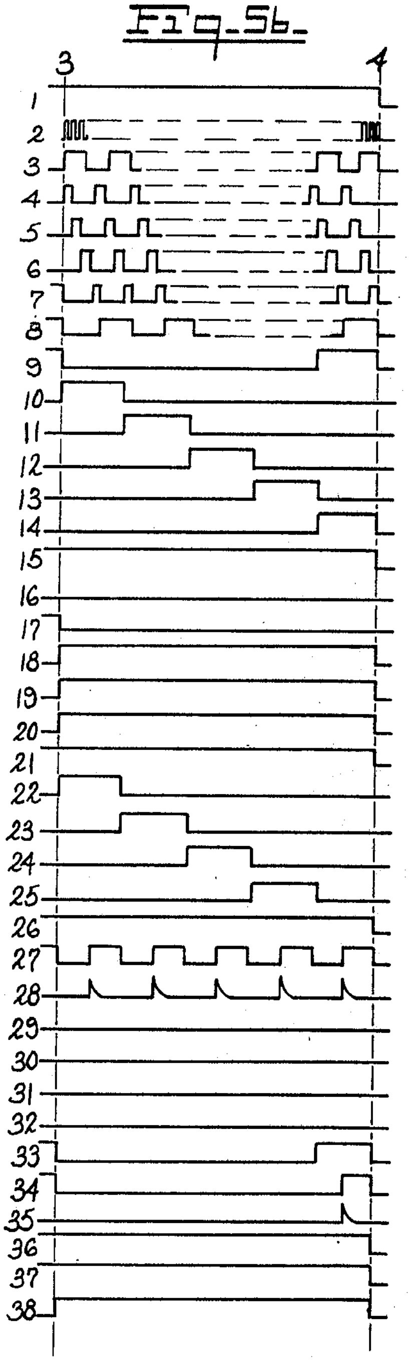

In the block diagram of FIG. 1, there are indicated points 1–38. Signal waveforms which appear at these points in the block diagram are shown in FIG. 5.

Figures 3, 4:
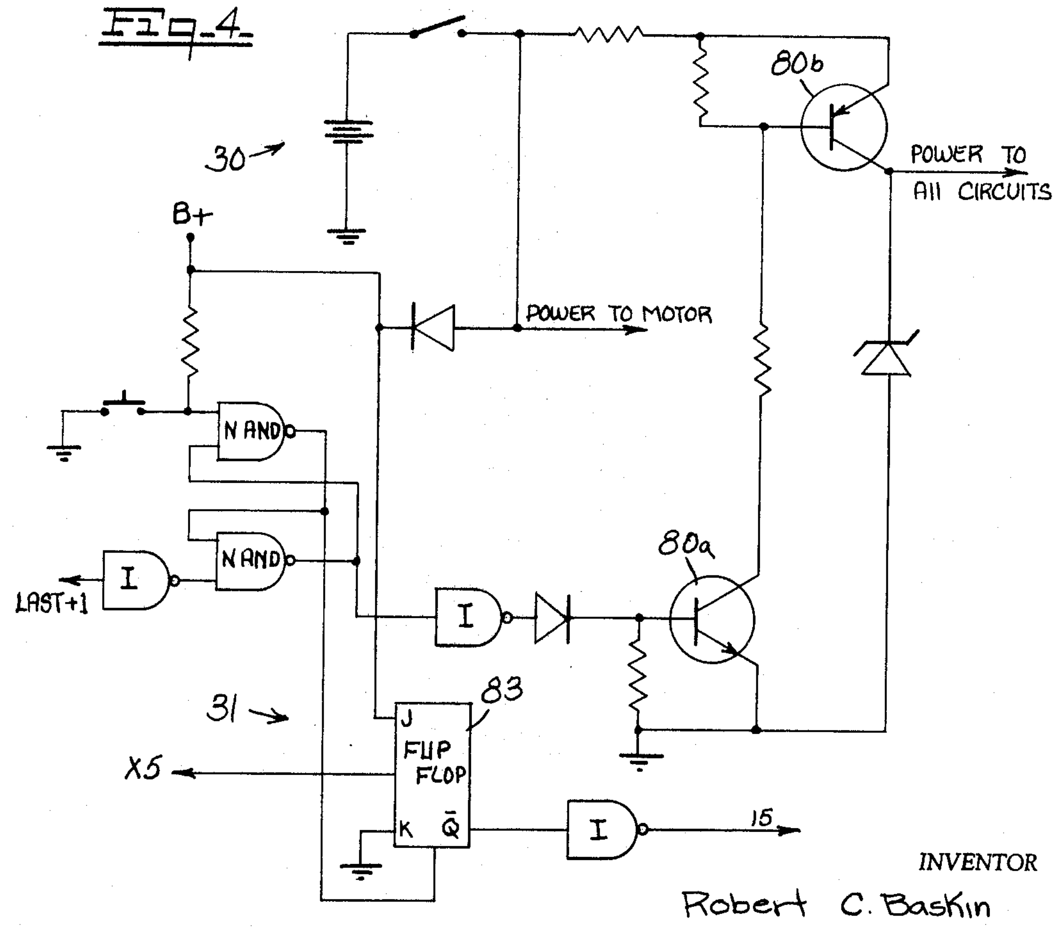
FIG. 3 is a truth table of the coded binary output from the decoder 34 of FIG. 1.
FIG. 4 is a schematic diagram, partially in block form, illustrating the start-stop circuit and the reset circuit of FIG. 1.

Referring now to FIGS. 2 and 3, there is shown in FIG. 3 the decimal to binary coded decimal decoder according to this invention. The information from the registers of the utility meter is shown at 0–9 on the lines going through the first set of NAND circuits 70–73. At its output, the NAND circuit 70 provides a binary code for a 1, circuit 71 provides a binary output for 2, circuit 72 provides the binary output 4 and circuit 73 provides the binary output 8. In this simple manner, the decimal output from the meter registers is converted to the format shown in the truth table of FIG. 3. The NAND circuits shown as connected provide the "AND FUNCTION" and "OR FUNCTION" shown in FIG. 1. It should be noted that the binary output obtained in this invention uses a 2 and an 8 binary representation as zero rather than normal all-zero representation for a zero. This type of code is used to determine if the system is functioning properly. Thereafter, the signals are gated through AND gates 37–40 as shown, and through OR circuit 41, thence through AND circuit 42 and the combination of a differentiator, generally shown at 43, to the tape head 36. The information to channel 2 also flows in the manner as described in connection with FIG. 1. The information provided on the channel 2 tape head is the negation of the information on channel 1. This information is later used in a playback device as timing signals to indicate where data would be present on the tape if it was obtained from the meter.

Referring now to FIG. 4, there is shown the start-stop circuit 30 in schematic form as well as the reset circuit 31. Initially, with the start switch open, the flip-flop shown at 83 and the shift register 28 are held in the disable or reset condition and no power is provided to all circuits (i.e., clock, etc.), except the stop-start and reset circuits. In order to start the system, the switch S2 is closed, providing power to the start-stop and reset circuits, and thereafter the pushbutton switch S1 is momentarily closed. This provides a signal to initiate conduction of the transistors **80*a* and 80*b* which supply power to all of the circuits of the system, except the stop-start and reset circuits, including clock 23, to initiate the interrogating operation. After a period of time, the ×5 signal appears to flip the flip-flop 83 in order to enable the register 28**.

Again, after a period of time, the last +1 signal appears in the shift register and turns off the power by turning off the transistors **80*a* and 80*b* and disables flip-flop 83. The flip-flop 83** may be of the type sold by Texas Instruments, SN7473.

To aid in the understanding of the system of FIG. 1, there is provided a timing diagram chart illustrating the waveforms at different points in FIG. 1. As may be seen, upon depression of the start button, a waveform appears at 1 on the start-stop circuit and applies power to the entire system, except for the start-stop and reset circuits. Thereafter, a train of pulses appears at 2, which is divided by 4 at 3 and applied along lines, 4, 5, 6 and 7, to step the tape. The signals at point 3 are then further divided by 2 to provide print signals, shown at 8. Then the print signal is also divided by 5 to provide four gating signals 10–13 and a fifth signal, shown at 14 and at 9, the signal 14 being utilized to indicate an end-of-digit as well as to cause the shift register to become enabled. The signal 9 is also further operated on to provide scanning signals such as shown at 16 and 17. The remainder of the waveforms indicate the flow of data through the system when the register 11 reads a 7 and the register 12 reads an 8.

From these diagrams, it may be seen that the data will be serially read onto the tape in proper sequence, in accordance with the data obtained from decoder 34.

Referring now to FIGS. 6 and 7, there is shown in logical block diagram form a scheme for obtaining the stepper motor signals 4–7 and a scheme for obtaining the ×1–×5 signals. The schemes use conventional flip-flops, such as the Texas Instrument type SN7473, and AND circuits to develop the signals required in a conventional manner.

Now referring to FIG. 8, there is shown a conventional 5-stage shift register in block form, using a flip-flop, such as Texas Instrument type SN7473, to develop the signals scan I, scan II, last +1, and end-of-word.

This recording system may be used as part of an overall meter reading system, including a playback system as disclosed in my U.S. patent application for "Playback System" Ser. No. 684,097 filed Nov. 3, 1967 and assigned to the same assignee as this application.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

What is claimed is:

1. For use in combination with a recording meter which stores data in coded format in registers; a recording system, means for converting the information in each register to another coded format, means for generating a plurality of scanning signals to sequentially interrogate each decade register, and applying the contents thereof to said converter, means for sequentially generating a plurality of gating signals during each scanning signal, a plurality of gates, means for applying said gating signals and the coded data from said converter to said gates to sequentially read the data from a scanned register, a record medium, means for driving said record medium at a predetermined rate, writing means, and means for applying the information read by said gates to said writing means as said recording medium is driven at said predetermined rate to write the read data on the record medium.

2. The system of claim 1 wherein the data from the meter is converted from decimal form to binary coded decimal and wherein a zero of the binary decimal code is represented by a 2 and an 8 in binary code.

3. The system of claim 1 wherein said means for generating scanning signals also generates a signal for recording on said record medium signals indicating that an end of the word has been reached.

4. The system of claim 1 wherein said means for generating scanning signals generates a signal to de-energize the system after all decade registers have been interrogated.

5. The system of claim 1 including means responsive to the absence of a signal from both the meter and said means for generating scanning signals for indicating if there is a failure in the meter.

6. A system for serially recording on a record medium information stored in a plurality of registers of a utility meter, including means for providing clock signals, means responsive to said clock signals for generating scanning signals to sequentially interrogate each register of the utility meter to cause information to be provided by each of said registers, means responsive to the information provided from each of said registers for converting the same from one coded format to another coded format, a plurality of coincidence gates, means responsive to said clock signals for sequentially generating gating signals to sequentially gate each information signal as coded through said plurality of gates during each scanning signal, and means responsive to said clock signals for generating signals to sequentially write the information passing through said gates on the record medium.

7. A system according to claim 6, in which means are provided responsive to said clock signals for stepping the record medium as the information is written thereon.

8. A system according to claim 6, in which the means for providing scanning signals provides a signal to stop the operation of the system after all the registers of the meters have been interrogated.

9. A system according to claim 6, in which means are provided to detect the scan signals and the information signals in order to indicate an error if the utility meter is operating improperly.

10. A magnetic tape recorded system for detecting information recorded in a plurality of registers of a utility meter, said system including clock means for providing timing signals, a magnetic tape drive system for moving a strip of magnetic tape across a recording head at a predetermined rate, a tape head for printing on the tape, means responsive to said timing signals for providing a plurality of scanning signals to interrogate the registers to provide information signals, means for coding the information signals to provide coded information signals, means for sequentially generating a plurality of gating signals in response to said timing signals during each scanning signal, first gating means responsive to said gating signals to sequentially read the coded information signals, second gating means, means responsive to said timing signals for providing print signals, said second gating means providing signals to said tape head upon reception of information signals from said first gating means, said scanning signals and said print signals.

11. A magnetic tape recorder system in accordance with claim 10, wherein said means providing gating signals also provides signals indicating an end of digit.

12. A magnetic tape recorder system according to claim 10, in which the means for providing scanning signals also provides signals to de-actuate the recorder after all the registers have been interrogated.

13. A magnetic tape recorder system according to claim 10, in which means are provided to detect said scan signals and said interrogation signals to provide an indication of the proper functioning of the meter.

14. A system for recording on a record medium the information stored in a meter having a plurality of decade registers comprising a drive system for the record medium adapted to move the medium at a predetermined rate, means for sequentially generating a plurality of scanning pulses to interrogate each decade register, means for converting the data of each decade register to binary coded decimal form, means for sequentially generating a plurality of gating pulses during each scanning pulse time, a plurality of coincidence gates, means for applying the binary coded decimal data and said gating pulses to said coincidence gates, and means for recording the data passed by said gates on the record medium.

References Cited

UNITED STATES PATENTS

| | | | |
|---|---|---|---|
| 3,195,139 | 7/1965 | Hood | 346—33 |
| 3,289,210 | 11/1966 | Davis et al. | 346—74 |
| 3,323,132 | 5/1967 | Davis et al. | 346—74 |
| 3,419,883 | 12/1968 | Chapsky | 346—74 |

JOSEPH W. HARTARY, Primary Examiner

U.S. Cl. X.R.

346—33